United States Patent [19]

Fay et al.

[11] 4,087,568
[45] May 2, 1978

[54] METHOD AND APPARATUS FOR CONTROLLING A MATERIAL TREATER AT MAXIMUM THROUGHPUT WITH AIR VELOCITY CONTROL

[75] Inventors: Charles Robert Fay, Bridgewater, N.J.; Raymond Joseph Williams, Fair Oaks, Calif.

[73] Assignee: Formica Corporation, Cincinnati, Ohio

[21] Appl. No.: 812,191

[22] Filed: Jul. 1, 1977

[51] Int. Cl.² ........................... B05C 3/12; B05D 1/18
[52] U.S. Cl. .......................................... 427/8; 34/52; 34/54; 118/5; 118/6; 118/8; 118/67; 118/69; 162/DIG. 11; 364/106; 364/469; 427/10; 427/378

[58] Field of Search ................... 118/2, 4, 5, 6, 7, 8, 118/9, 10, 11; 427/8–10, 377, 378; 34/44, 46, 48, 52, 54, 56; 235/151.1, 151.3; 162/DIG. 10, DIG. 11

[56] References Cited

U.S. PATENT DOCUMENTS

| | | | |
|---|---|---|---|
| 3,596,071 | 7/1971 | Doering | 118/8 X |
| 3,687,802 | 8/1972 | Rummel et al. | 162/DIG. 11 |
| 3,989,934 | 11/1976 | Fay | 235/151.1 |
| 3,989,935 | 11/1976 | Fay | 118/8 X |
| 3,989,936 | 11/1976 | Fay et al. | 235/151.3 X |

*Primary Examiner*—Morris Kaplan
*Attorney, Agent, or Firm*—Frank M. Van Riet

[57] ABSTRACT

An improved process and apparatus are disclosed wherein the resin treatment of a web on a material treater is conducted at maximum throughput in response to especially impinging air velocity control in the dryer.

6 Claims, 4 Drawing Figures

METHOD AND APPARATUS FOR CONTROLLING A MATERIAL TREATER AT MAXIMUM THROUGHPUT WITH AIR VELOCITY CONTROL

BACKGROUND OF THE INVENTION

U.S. Pat. No. 3,596,071 discloses and claims a method and apparatus for the control of a coater and a dryer of a material treater wherein variables such as moisture content, resin solids concentration, percent resin and percent volatiles are measured and/or computed according to various mathematical formulae. The computed values are then used to control the rate of resins application and the amount of drying of the treated material such as by varying the heat input to the dryer by means of adjustable dampers. The controls effected by the patentee are not capable of optimizing line speed with the constraints of maximum web temperature and maximum specification line speed because no provision is set forth therein wherein the line speed is adjusted in conjunction with variations in the air velocity impinging on the web.

U.S. Pat. No. 3,845,287, assigned to Formica Corporation, overcame the difficulties exhibited by the prior art control procedures and apparatus in the treatment of material webs. This invention permitted higher line speeds to be obtained for a given material treated, while maintaining the desired drying level and preventing the desired maximum web temperature from being exceeded. The desired results are obtained by the use of a computer which executes the logic required to increase treater line speed, by changing dryer zone temperatures.

Although this patent achieves improved line speeds and dryer control, as measured by % VA or other control formulae, the slow response of the dryer temperatures to set point changes result in suboptimal line speeds and dryer control via % VA (or other mathematical formulae).

The present invention overcomes the slow dryer temperature response problem by using a combination control method and apparatus. The drying rate can be controlled by controlling the air velocity of the dryer of the material treater as it impinges on the material web. The dryer control formulae (% VA or other) can be controlled precisely and instantaneously by changing the dryer supply fan RPMs, varying damper settings etc. to change the air velocity and air quantity thus effecting a change in drying rate, hence % VA, while maintaining line speed at a constant, maximum desirable value.

Other benefits accure from running at a constant, maximum line speed, in addition to increased productivity. Some of these are:

1. No interactions between the coater and dryer line speed changes. Line speed changes upset coating operations, necessitating feed forward control schemes for coater/line speed interactions, resulting in off-spec coat weight control and increased control system complexity.

2. No resetup of the stacker/cutter system required. Changes in speed often necessitate repositioning of stacker belts to optimize stacker operations. Stacker jams can result, causing equipment down time, hence lost production.

SUMMARY

We have now discovered a new and novel method and apparatus which overcomes the difficulties exhibited by the prior art control procedures and apparatus in the treatment of material webs. Our invention permits a treater to be continuously operated at maximum possible line speed for a given product being treated, while maintaining the desired drying level and preventing the desired maximum web temperature from being exceeded. We attain these advantageous results by the use of a computer which executes the logic required to control the treater drying rate by varying the revolutions per minute of the drying zone fan (or by damper setting changes) to effect air velocity control of the drying rate, while independently controlling the treater line speed at maximum specification line speed and dryer zone temperatures. The line speed is only lowered from the maximum specification line speed if the maximum web temperature is exceeded. The line speed is then lowered to allow additional web cooling by increasing web dwell times in the cooling zones. Correspondingly, dryer zone temperatures are lowered in order to again achieve dryer control through the use of air velocity control. Our novel improvement also accounts for a given range of air velocity control for each weight of web product treated. To those skilled in the art of web handling, it is a recognized fact that each weight and type of web material requires a given range of air velocity in order to enable it to pass successfully through the dryer. Our novel method and apparatus takes these facts into account by modifying dryer zone temperatures as the upper or lower air velocity limits are approached for a given product.

DESCRIPTION OF THE INVENTION INCLUDING PREFERRED EMBODIMENTS

Figure 1:
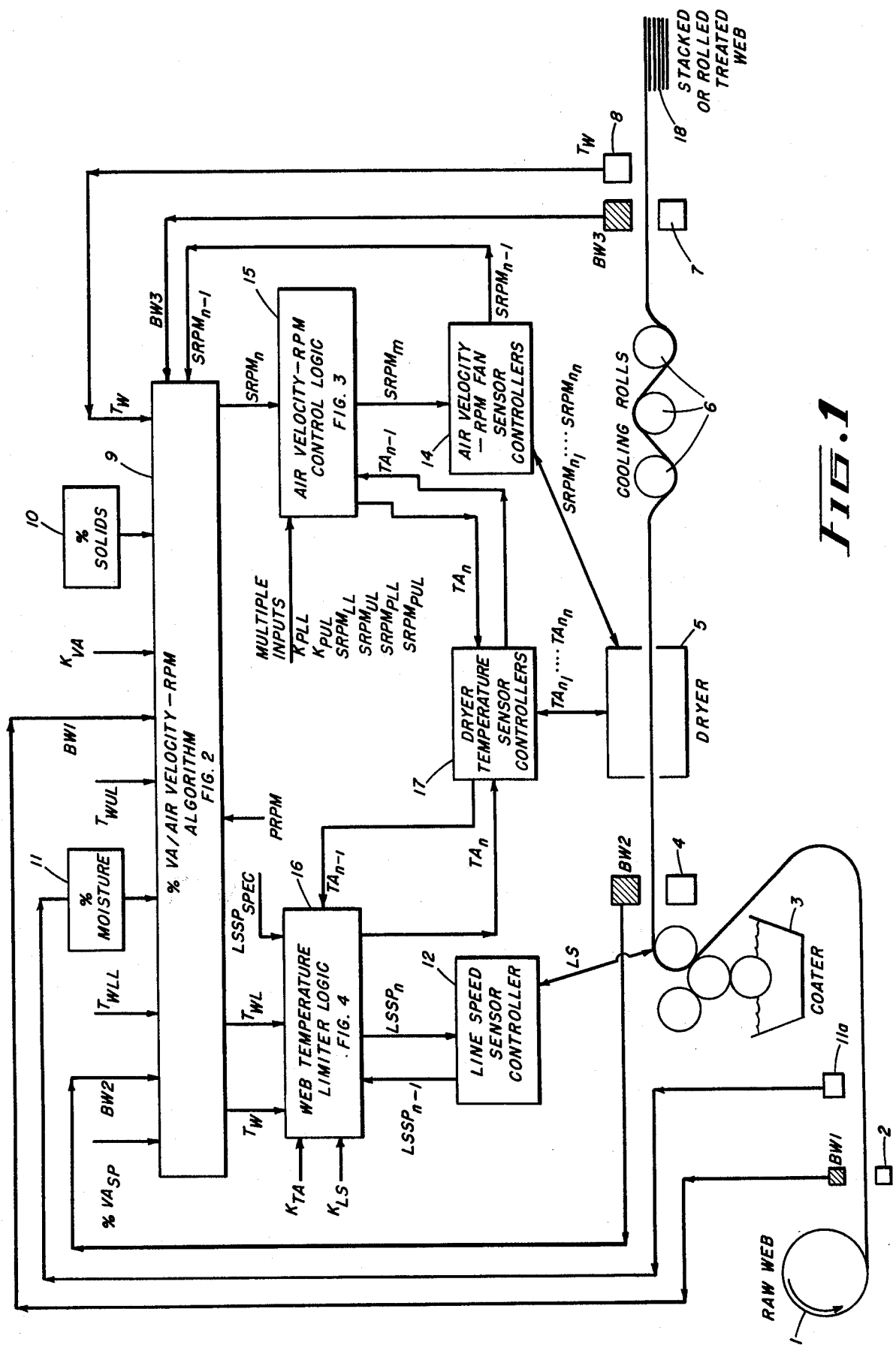
FIG. 1 is a diagrammatic view of a drying process for a material treater illustrative of the operation of the air velocity-air line speed maximization control algorithm of the present invention.

With reference to the drawings, specifically FIG. 1, a material treating process is shown wherein a raw web 1, advantageously employed as a roll, is passed through a coater 3 where the material to be applied thereto is deposited thereon. The coater may apply the material to one or both sides of the web and the material applied may coat the web, be absorbed thereby to produce an impregnated product or both. The so-treated web then passes through a dryer 5 where the volatiles are driven off and the deposited or impregnated material is dried. The web passes through the dryer and is cut and stacked or rolled as shown at 18.

In order to more practically describe our invention, we will illustrate its feasibility with reference to the impregnation of a paper web with a volatile solution of a resinous material such as a phenolic resin or a melamine/formaldehyde resin, although it should be understood that other types of materials may be coated or impregnated with a multiplicity of different substances.

To best understand the invention, a brief definition of various terms used hereinafter is believed useful. The term "BW1" refers to the basis weight of the web being passed into the coater and constitutes its total weight, i.e., dry fiber weight plus any moisture weight therein. The term "BW2" refers to the basis weight of the impregnated web and also constitutes its total weight, i.e., dry fiber weight, moisture weight, resin weight plus the weight of the volatiles added from the resin solution. The term "BW3" refers to the basis weight of the dried, treated web and also constitutes its total weight, i.e., dry fiber weight, moisture weight, dried resin weight and residual volatile weight. It can be readily appreciated that from these measured basis weights, the amounts of various constituents of the resin solution added and web per se can be calculated. These basis weight measurements and their relationship to one another are thoroughly discussed in the above-mentioned U.S. pat. Nos. 3,596,071; 3,845,286; 3,989,934; 3,989,935; 3,989,936 and 3,989,937.

Again with reference to FIG. 1, the web 1, i.e., paper, glass, metal, etc., passes through gauge 2 wherein the web basis weight BW1 is measured. The resin is then applied to the web by coater 3 and gauge 4 measures the raw web and the resin solids and the resin solvents (volatiles) basis weight, BW2. The treated web continues through dryer 5 wherein the web is dried to the desired percent volatiles, calculated as described below. Cooling rolls 6 cool the dried, treated web to the desired level to prevent exotherm and/or blocking in the stack 18 or roll of treated material. Gauge 7 measures the treated web basis weight BW3 and a device 8, such as an infrared pyrometer or a non-contact thermal conductance meter, measures the web temperature, $T_W$, after the cooling rolls and directly before the web is cut and stacked or rolled. Device 8 then sends a signal indicating the web temperature to block 9.

As mentioned above, the drying of the web is controlled by air velocity adjustments to maintain the desired % VA, where $$\%VA = \left[ \frac{BW3 - BW1\left(1 - \frac{\%M}{100}\right) - (BW2 - BW1)F}{BW1\left[1 - \frac{\%M}{100}\right]} \right] 100$$

wherein VA = total residual volatiles in the dried treated web

M = percentage of moisture content of the raw web

F = resin solids fraction

The M is either a known factor or can be measured during the process by moisture gauge 11a, positioned before coater 3 such as described in U.S. Pat. No. 3,596,071 and shown at block 11 as % moisture. Gauges 2, 4 and 7 are well known and may constitute so-called "Beta" gauges, also as described in the above-mentioned patent. They, as well as device 8 and moisture gauge 11a, may be located at a fixed point across the web and adjacent thereto or adapted to scan or traverse back and forth across the web.

Cooling rolls 6 are not critical per se and they may be omitted entirely or replaced with analogous equivalent means for cooling the web, including merely contacting the treated web with air under ambient conditions. The web must, however, always be cooled upon exiting the dryer.

The velocity of the air impinging on the web in dryer 5 can be induced by any known means such as a fan and can be controlled or regulated by means apparent to those skilled in the art such as a variable speed motor, stratigically located dampers, adjustable nozzles, headers which move perpendicularly to the plane of the web, fan blade pitch and the like. For purposes of the following discussion and as indicated on the accompanying drawings, reference will be made hereinbelow to the use of a fan as the velocity inducing means and a variable speed motor as the regulating means, both of which are preferred.

Outputs or instrument responses from gauges 2, 4 and 7 and 11 are transmitted to % VA/Air Velocity-RPM Algorithm block 9 where they are used to calculate %VA in conjunction with the percent resin solids or F block 10. The other inputs to block 9 are $K_{VA}$, a tuning factor, PRPM, the partial derivative calculated from the change in %VA (Δ% VA) affected by a given change in dryer fan RPMs (ΔRPM), which is determined experimentally using known parameter identification and tuning techniques familiar to those skilled in the art, % $VA_{SP}$, the specification percent volatiles of the dried, treated web, $SRPM_{n-1}$, the previous time interval setpoint for the fan RPMs of each individual drying zone, i.e., the velocity of the air impinging on the web in the dryer, $T_{WUL}$, the upper limit allowed for the web temperature, $T_W$, the web temperature and $T_{WLL}$, the web temperature lower limit.

Depending on the calculations and logic of block 9, the outputs are $T_W$ and $T_{WL}$, the upper or lower limit exceeded if $T_W$ does not fall within limits $T_{WUL}$ and $T_{WLL}$, to web temperature limiter logic 16, the current RPM setpoint(s) for all dryer zones, i.e., desired velocity of air, to air velocity-RPM control logic 15.

The operations of the algorithm 9 will be explained in more detail under the description for FIG. 2.

Two additional inputs to block 16 are $LSSP_{n-1}$, the line speed setpoint for the previous interval, $n-1$, from line speed sensor controller 12 and $LSSP_{SPEC}$, the maximum allowable line speed setpoint. The output from block 16 is $LSSP_n$ to line speed sensor controller 12. $LSSP_n$ is the new line speed setpoint for the current time interval, $n$. $K_{TA}$ and $K_{LS}$ are tuning factors used in the calculation. $TA_{n-1}$, an input from block 17, is the dryer air temperature for the previous time interval, $n-1$ and $TA_n$, output to block 17, is the new dryer air temperature for the current time interval, $n$. The operations of block 16 will be described in greater detail under the description of FIG. 4.

Block 15 is the air velocity-RPM control logic block. Depending on the calculations and logic of this block, the outputs are $T_{An}$ to block 17, described above, and $SRPM_m$, the new air velocity setpoint, to block 14, the air velocity-RPM fan sensor controllers.

Figure 3:
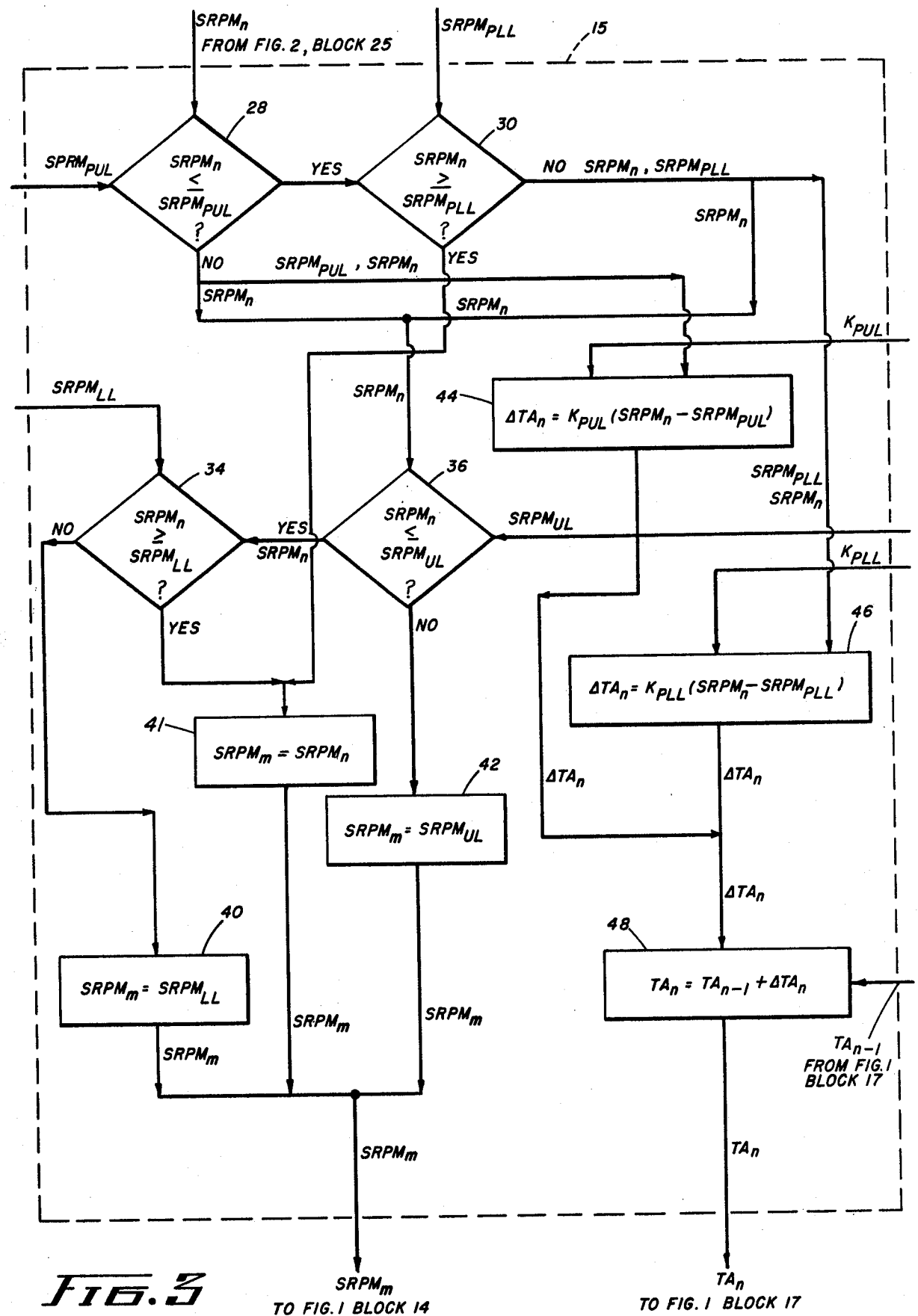
FIG. 3 is a flow diagram of the calculations and equipment adjustment signals which are derived in the air velocity - RPM control logic of block 15 of FIG. 1.

The inputs to block 15 are $SRPM_n$ from block 9, $TA_{n-1}$ from block 17, both described above, and multiple data base inputs $K_{PLL}$, $K_{PUL}$, $SRPM_{LL}$, $SRPM_{UL}$, $SRPM_{PUL}$, and $SRPM_{PLL}$. From those inputs the above listed control outputs are calculated. A detailed description of block 15 and the data base inputs are given when FIG. 3 is described hereinbelow.

Blocks 9, 15 and 16 represent any known logic device such as a digital computer, an analog computer, a function generator, a mechanical controller or the like. Line speed sensor controller 12, dryer temperature sensor controllers 17 and air velocity-RPM fan sensor controllers 14 are any standard analog or digital control devices which compare desired setpoint signals to actual measured signals and generate a control signals that manipulate a device, i.e., open or close steam valves, heat or cool dryer zones, raise or lower the line speeds of the material treaters, open or close relays of variable speed fan motors, etc.

According to the instant invention, sensor-controller 12 compares $LSSP_n$ to the current line speed LS and regulates the speed of the web through the treater in accordance with said comparison.

Sensor-controllers 17 compare the actual dryer zone temperatures, $TA_{n_1}, \ldots TA_{nm}$, to the new dryer zone air temperature setpoints, $TA_n$, and regulate the temperature in the dryer zones in accordance therewith.

Air velocity-RPM fan sensor controllers 14, compare the actual RPM of the fans, $SRPM_{n_1}, \ldots SRPM_{nn}$, to the new air velocity setpoint, $SRPM_m$ and regulate the revolutions per minute of the fans inducing the air in the dryer 5.

Figure 2:
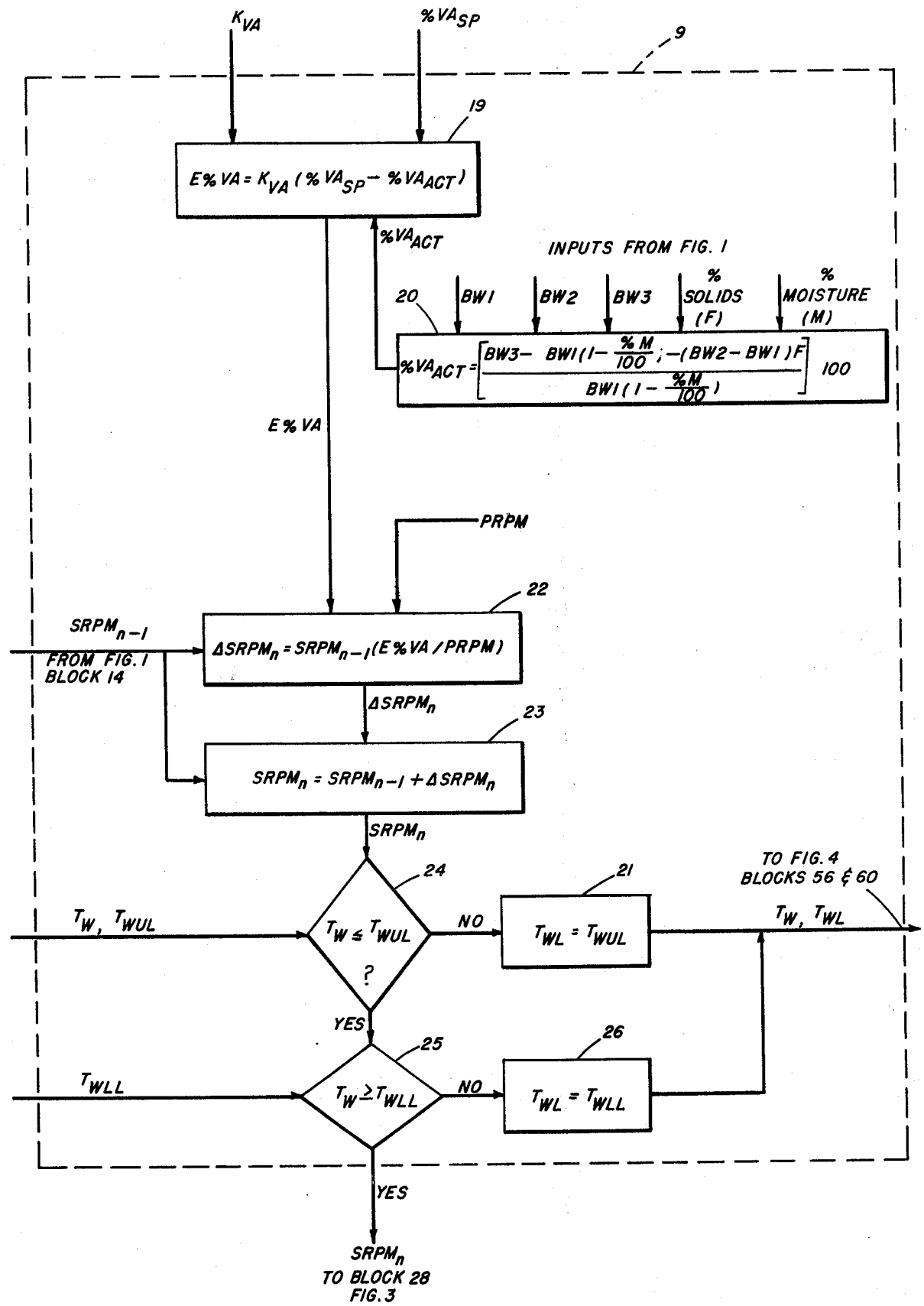
FIG. 2 is a flow diagram of the calculations and equipment adjustment signals which are derived in the % VA-Air Velocity - RPM Algorithm of block 9 of FIG. 1.

To accomplish the computations and controls of the instant invention, there is provided a flow diagram of block 9, the % VA/Air Velocity-RPM Algorithm, in FIG. 2. Block 19 of FIG. 2 calculates the error correction for % VA, E % VA, from $K_{VA}$, a tuning factor, % $VA_{SP}$, the % VA specification desired for the product, and % $VA_{ACT}$, the actual % VA, as calculated in block 20 from gauge inputs BW1, BW2, BW3, % moisture, and percent solids F, all from FIG. 1. $K_{VA}$, as well as the other tuning factors of this instant invention, can be determined experimentally using simple methods or by processes of model testing and interaction schemes, as are known in the art, see, for example. U.S. Pat. Nos. 3,543,010; 3,534,400; 3,532,862. The calculation performed in block 19 is as follows:

$$E\ \%\ VA = K_{VA}(\%VA_{SP} - \%VA_{ACT})$$

the output from 19 is the input, E % VA, to block 22, along with PRPM, the partial derivative representing the affect of a change in dryer zone fan RPM, $\Delta$RPM, upon % VA, to produce a change, $\Delta$ % VA. Therefore, the partial derivative, PRPM, can be given as follows:

$$PRPM = \frac{\Delta \%VA}{\frac{\Delta RPM}{RPM}}$$

Block 22 calculates $\Delta SRPM_n$, the change in dryer zone fan RPM setpoint(s) required to correct for E % VA, VA error as follows:

$$\Delta SRPM_n = SRPM_{n-1}(E\% \ VA/PRPM)$$

where $SRPM_{n-1}$, from FIG. 1, block 14, is the velocity of the air impinging upon the web in said dryer at the previous time interval, $n-1$. The output, $\Delta SRPM_n$, from 22 is the input to block 23, along with $SRPM_{N-1}$. The desired velocity of air, $SRPM_n$, for the present time interval, $n$, is calculated as follows:

$$SRPM_n = SRPM_{n-1} + \Delta SRPM_n$$

The output $SRPM_n$ from block 23 is the input to logic block 24, along with the web temperature, $T_W$, from block 8, FIG. 1 and $T_{WUL}$, described above.

If $T_W \leq T_{WUL}$, $T_W$ is compared to $T_{WLL}$, the web temperature lower limit, in block 25. If $T_W \geq T_{WLL}$, the % VA is then controlled by changing the air velocity-RPM setpoint $SRPM_m$, within the desired limitations of upper and lower RPM (or air velocity) limitations, through the logic of block 15, FIG. 1.

Figure 4:
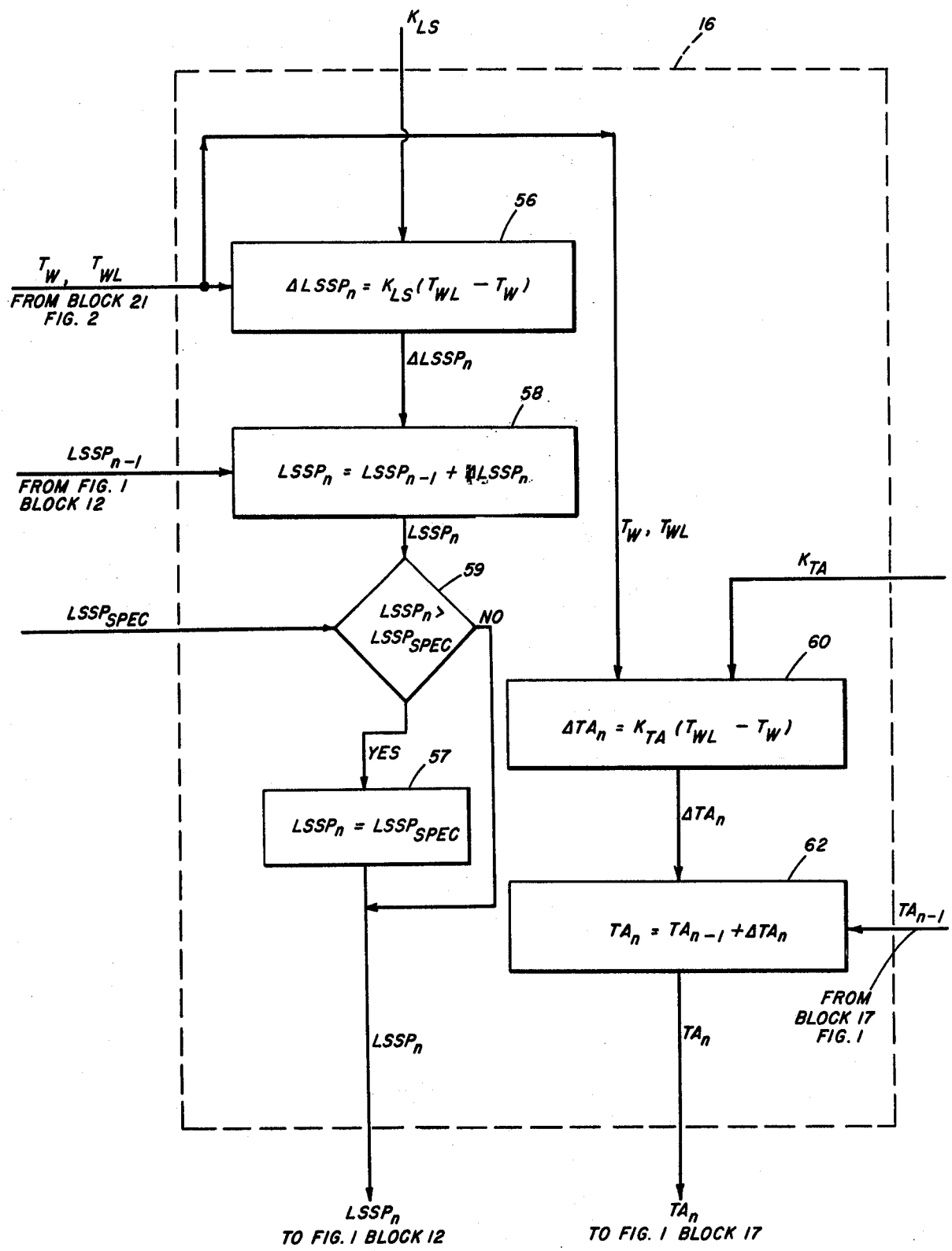
FIG. 4 is a flow diagram of the calculations and equipment adjustment signals which are derived in the web temperature limiter logic of block 16 of FIG. 1.

If, however, $T_W$ is not less than or equal to $T_{WUL}$, which will cause exotherm or blocking of the stacked or rolled treated material, $T_{WL}$, the upper web temperature limit exceeded, is set equal to $T_{WUL}$ in block 21 and $T_W$ and $T_{WLL}$ are outputted to FIG. 4, the logic of which is used to slow down the line speed to allow more dwell time, hence web cooling, on the cooling rolls or other cooling means. FIG. 4 logic will be described later. If $T_W$ is not greater than or equal to $T_{WLL}$, which implys that the line speed is running below its lower limit, $T_{WL}$, the lower web temperature limit exceeded, is set equal to $T_{WLL}$ in block 26 and $T_W$ and $T_{WL}$ are again outputted to FIG. 4.

FIG. 3 is the air velocity-RPM control logic diagram of block 15, FIG. 1. The purpose of the logic and calculations in this figure is to determine if the RPM setpoint, $SRPM_n$ from FIG. 2, block 25, is within the range of $SRPM_{PLL}$ to $SRPM_{PUL}$, the lower and upper preliminary limits, respectively, of the air velocity. If $SRPM_m$, the new air velocity setpoint, is outside this range, then new air temperature setpoints $TA_n$ are used to control the drying rate.

$SRPM_{PLL}$ and $SRPM_{PUL}$ are within the "hard stop" absolute limits, $SRPM_{LL}$ and $SRPM_{UL}$, the lower and upper limits of air velocity, respectively, to allow time for the dryer zone temperatures to reach the new setpoints, $TA_n$. The preliminary limits can be established through known tuning procedures to establish the time constant and dead times of the dryer oven zones, and hence the needed $SRPM_{PLL}$ and $SRPM_{PUL}$ limits.

Logic block 28 of FIG. 3 determines if $SRPM_n$ is less than or equal to $SRPM_{PUL}$. If the answer is no, meaning $SRPM_n$ is greater than $SRPM_{PUL}$, $SRPM_{PUL}$ and $SRPM_n$ are passed as inputs to block 44 which calculates $\Delta TA_n$, the dryer temperature setpoint decrease required to lower the drying rate, as measured by % VA so that $SRPM_n$ will fall below $SRPM_{PUL}$ so that fan RPM-air velocity can again control % VA. The calculations of block 44 follow:

$$\Delta TA_n = K_{PUL}(SRPM_n - SRPM_{PUL})$$

where $\Delta TA_n$ = the dryer temperature setpoint decrease $K_{PUL}$ = a tuning factor determined experimentally, etc., as mentioned previously for $K_{VA}$ tuning factor $\Delta TA_n$ is then inputted to block 48 which then calculates the new dryer air temperature setpoint(s) as follows:

$$TA_n = TA_{n-1} + \Delta TA \text{ wherein } TA_{n-1}$$

is inputted from block 17, FIG. 1. The $TA_n$ setpoint(s) is then sent to temperature sensor controller 17 of FIG. 1, to control the multiple dryer zones.

If the answer from block 28 is yes, meaning that $SRPM_n$ is less than or equal to $SRPM_{PUL}$, then block 30 checks to see if $SRPM_n$ is greater than or equal to the preliminary lower limit, $SRPM_{PLL}$. If the answer is no, block 46 calculates the $\Delta TA_n$ temperature setpoint increase as follows:

$$\Delta TA_n = K_{PLL}(SRPM_n - SRPM_{PLL})$$

where $K_{PLL}$ = a tuning factor determined in same manner as $K_{PUL}$ and $K_{VA}$ $\Delta TA_n$ is then inputted to block 48 which determines the new air temperature setpoint(s) $TA_n$, which are then sent to block 17, FIG. 1 as described above.

If the answer from block 30 is yes, this means that $SRPM_n$ is within the limits of $SRPM_{PLL}$ and $SRPM_{PUL}$, so that $SRPM_m$ is now the new setpoint to air-velocity-RPM controller 14 of FIG. 1 as shown in block 41. In all other cases, the $SRPM_n$ value from either block 28 or 30 is inputted to block 36 $SRPM_n$ value from either block 28 or 30 is inputted to block 36 to determine if $SRPM_n$ is less than or equal to the upper limit. If the answer is no, block 42 sets $SRPM_m = SRPM_{UL}$ and $SRPM_m$ becomes the new air velocity setpoint to block 14. If the answer is yes, block 34 checks to see if $SRPM_n$ is greater than or equal to $SRPM_{LL}$, the lower limit for air velocity-RPM control. If the answer is yes, $SRPM_n$ is sent to block 41 and then to block 14 as $SRPM_m$. If the answer is no, $SRPM_m$ is set equal to $SRPM_{LL}$ in block 40 and then the new setpoint $SRPM_m$ is sent to block 14 from which a control signal is sent to the dryer fans to increase or decrease the fan RPM and thereby the air velocity, effecting the desired dryer control as measured by % VA.

FIG. 4 is the web temperature limiter logic block 16, of FIG. 1. If in block 24, FIG. 2, it is determined that $T_W$ is greater than $T_{WL}$ then $T_{WL}$ and $T_W$ are outputted from block 21, FIG. 2, into block 56, FIG. 4, which calculates the amount of line speed decrease required to cool the web so that $T_W \leq T_{WUL}$ by the following equation:

$$\Delta LSSP_n = K_{LS}(T_{WL} - T_W)$$

where $\Delta LSSP_n$ = change in line speed setpoint required, $K_{LS}$ = another tuning factor derived similarly to those explained above.

$\Delta LSSP_n$ is then inputted, along with $LSSP_{n-1}$ from block 12, FIG. 1, to block 58 which then calculates the new line speed setpoint, $LSSP_n$, as follows:

$$LSSP_n = LSSP_{n-1} + \Delta LSSP_n$$

$LSSP_n$ is then inputted to block 59 as is $LSSP_{SPEC}$, as defined above, wherein it is determined whether $LSSP_n$ is greater than $LSSP_{SPEC}$. If the answer is no, $LSSP_n$ becomes the new line speed setpoint for block 12, FIG. 1. If the answer is yes, $LSSP_n$ is set equal to $LSSP_{SPEC}$ in block 57 and the new $LSSP_n$ then becomes the input to block 12.

In order that % VA be kept within specification, the dryer temperature setpoint is lowered by amount $\Delta TA_n$ as described below. To effect this change, $T_W$ and $T_{WL}$ are also inputted to block 60, FIG. 3, from block 21. FIG. 2, along with $K_{TA}$. $\Delta TA_n$ is calculated as follows:

$$\Delta TA_n = K_{TA}(T_{WL} - T_W)$$

where $K_{TA}$ = another tuning factor derived as explained above. $\Delta TA_n$ is then inputted to block 62 which calculates the new dryer air temperature setpoint(s) $TA_n$ as follows:

$$TA_n = TA_{n-1} + \Delta TA_n \cdot TA_{n-1}$$

being inputted thereto from block 17, FIG. 1. The calculated $TA_n$ setpoint is sent to temperature controller 17 of FIG. 1, to control the dryer temperature setpoints.

If in block 25, FIG. 2, it is determined that $T_W$ is less than $T_{WLL}$, then $T_{WL}$ and $T_W$ are outputted from block 26 into blocks 56 and 60 which calculate the amount of line speed increase allowable and the corresponding temperature increase the keep $\Delta VA$ with specification, respectively.

The equations or mathematical models set forth in 19, 22, 23, 44, 46, 48, 56, 58, 60 and 62 are examples only and can range from these relatively simple representations to very complex systems formed by fitting experimental data to the models.

Many other analog circuits, components and other devices consisting of mechanical, electronic, pneumatic and/or hydraulic devices can be used in our invention.

We claim:

1. A method of controlling the drying of a fibrous host material which has been treated with a resinous solution in a dryer which comprises:
    1. measuring the weight of said host material before treating and providing a signal (A) representative of said weight before treating,
    2. measuring the weight of the treated material before drying and providing a signal (B) representative of said weight before drying,
    3. measuring the weight of the dried, treated material and providing a signal (C) representative of said weight after drying,
    4. providing a signal (D) representative of the resin solids fraction of said resinous solution,
    5. determining the actual percent volatiles of said dried, treated material from said signals (A), (B), (C) and (D) and providing a signal (E) representative of said percent volatiles,
    6. providing a signal (F) representative of the specification percent volatiles of said dried, treated material,
    7. determining the variation between said signals (E) and (F) and providing a signal (G) representative of said variation,
    8. providing a signal (H) representative of the velocity of the air impinging upon said host material in said dryer,
    9. calculating the desired velocity of air in said dryer from said signals (G) and (H) and providing a signal (I) representative of said desired velocity of air,
    10. measuring the temperature of said dried, treated material after it exits the drier and providing a signal (J) representative of said temperature,
    11. providing a signal (K) representative of the upper limit of the temperature of said dried, treated material and a signal (L) representative of the lower limit of the temperature of said dried, treated material,
    12. determining whether said signal (J) falls within the limits represented by said signals (K) and (L) and providing a signal (M) representative of the upper or lower limit exceeded if said signal (J) does not fall within said limits,
    13. providing a signal (N) representative of the line speed set point of said host material,
    14. providing a signal (O) representative of the maximum allowable line speed set point of said host material, 15. calculating the new line speed set point of said host material from said signals (J), (M), (N) and (O) and providing a signal (P) representative of said new line speed set point,
16. providing a signal (Q) representative of the temperature of the air in said dryer,
17. calculating the new temperature set point of the air in said dryer from said signals (J), (M) and (Q) and providing a signal (R) representative of said new temperature set point,
18. providing a signal (S) representative of the preliminary lower limit of the air velocity in said dryer,
19. providing a signal (T) representative of the preliminary upper limit of the air velocity in said dryer,
20. providing a signal (U) representative of the lower limit of the air velocity in said dryer,
21. providing a signal (V) representative of the upper limit of the air velocity in said dryer,
22. calculating the new air velocity set point from signals (I), (S), (T), (U) and (V) and providing a signal (W) representative of said new air velocity set point,
23. calculating the new temperature set point of the air in said dryer from said signals (I), (S), (T) and (Q) and providing a signal ($R^1$) representative of said new air temperature set point,
24. controlling the line speed of said host material in conformity with said signal P,
25. controlling the velocity of the air in said dryer in conformity with said signal W and
26. controlling the temperature of the air in said dryer in conformity with either signal (R) or signal ($R^1$).

2. A method according to claim 1 wherein the temperature of the air in said dryer is controlled in conformity with said signal (R).

3. A method according to claim 1 wherein the temperature of the air in said dryer is controlled in conformity with said signal ($R^1$).

4. A method according to claim 1 including providing a signal (X) representative of the moisture content of said host material before treating and using said signal (X) in step 5.

5. In a fibrous host material treating process wherein said material is treated with a resinous solution in a treater and dried in a dryer, apparatus for controlling the drying of said treated material comprises
1. first gauge means adjusted to said material for measuring the weight of said material before treating and providing a signal (A) representative of said weight before treating,
2. second gauge means mounted before said dryer and adjusted to said material for measuring the treated, undried weight of said material and providing a signal (B) representative of said treated, undried weight,
3. third gauge means mounted after said dryer and adjusted to said material for measuring the dried weight of said material and providing a signal (C) representative of said dried weight,
4. means for providing a signal (D) representative of the resin solids fraction of said resinous solution,
5. means responsive to said signals (A), (B), (C) and (D) for computing the actual percent volatiles of the dried, treated material and providing a signal (E) representative of said percent volatiles,
6. means for providing a signal (F) representative of the specification percent volatiles of the dried, treated material,
7. means responsive to said signals (E) and (F) for determining the variation between said signals (E) and (F) and providing a signal (G) representative of said variation,
8. means for measuring the velocity of the air impinging upon said host material in said dryer and providing a signal (H) representative of said velocity,
9. means responsive to said signals (G) and (H) for calculating the desired velocity of air in said dryer and providing a signal (I) representative of said desired velocity,
10. means for measuring the temperature of the dried, treated material after it exits the drier and providing a signal (J) representative of said temperature,
11. means for providing a signal (K) representative of the upper limit of the temperature of said dried, treated material and a signal (L) representative of the lower limit of the temperature of said dried, treated material,
12. means responsive to said signals (J), (K) and (L) for determining whether said signal (J) falls within the limits represented by said signals (K) and (L) and providing a signal (M) representative of the upper or lower limit exceeded if said signal (J) does not fall within said limits,
13. means for providing a signal (N) representative of the line speed set point of said host material,
14. means providing a signal (O) representative of the maximum allowable line speed set point of said host material,
15. means responsive to said signals (J), (M), (N) and (O) for calculating the new line speed set point of said host material and providing a signal (P) representative of said new line speed set point,
16. means for measuring the temperature of the air in said dryer and providing a signal (Q) representative of said air temperature,
17. means responsive to said signals (J), (M) and (Q) for calculating the new temperature set point of the air in said dryer and providing a signal (R) representative of said new air temperature set point,
18. means for providing a signal (S) representative of the preliminary lower limit of the air velocity in said dryer,
19. means for providing a signal (T) representative of the preliminary upper limit of the air velocity in said dryer,
20. means for providing a signal (U) representative of the lower limit of the air velocity in said dryer,
21. means for providing a signal (V) representative of the upper limit of the air velocity in said dryer,
22. means responsive to said signals (I), (S), (T), (U) and (V) for calculating the new air velocity set point and providing a signal (W) representative of said new air velocity set point,
23. means responsive to said signals (I), (S), (T) and (Q) for calculating the new temperature set point of the air in said dryer and providing a signal ($R^1$) representative of said new air temperature set point,
24. means responsive to said signal (P) for controlling the line speed of said host material,
25. means responsive to said signal (W) for controlling the velocity of the air in said dryer and
26. means responsive to either of said signal (R) and said signal ($R^1$) for controlling the temperature of the air in said dryer.

6. Apparatus according to claim 5 comprising fourth gauge means mounted before said dryer and adjusted to said host material so as to measure the average moisture content of said material and provide a signal (X) representative of said moisture content to said means 5.

* * * * *